(12) United States Patent
Salter et al.

(10) Patent No.: US 11,970,139 B2
(45) Date of Patent: Apr. 30, 2024

(54) SYSTEM AND METHOD FOR MODULAR VEHICLE STORAGE

(71) Applicant: Ford Global Technologies, LLC, Dearborn, MI (US)

(72) Inventors: Stuart C. Salter, White Lake, MI (US); David Brian Glickman, Southfield, MI (US); Hussein Berry, Dearborn, MI (US); Adam Carlson, Ann Arbor, MI (US); Peter Phung, Windsor (CA); Benjamin Richer, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 130 days.

(21) Appl. No.: 17/078,214

(22) Filed: Oct. 23, 2020

(65) Prior Publication Data
US 2022/0126756 A1    Apr. 28, 2022

(51) Int. Cl.
*B60R 7/04*    (2006.01)

(52) U.S. Cl.
CPC ...................... *B60R 7/04* (2013.01)

(58) Field of Classification Search
CPC .............. B60R 7/00; B60R 7/04; B60R 7/046
See application file for complete search history.

(56) References Cited

U.S. PATENT DOCUMENTS

| | | | |
|---|---|---|---|
| 4,143,902 A * | 3/1979 | Johnstone | B60N 3/16 292/256.71 |
| 4,655,499 A * | 4/1987 | Piper | E05D 3/127 49/246 |
| 4,917,430 A * | 4/1990 | Lawrence | B60R 9/02 224/281 |
| 6,059,341 A * | 5/2000 | Jensen | B60P 3/14 292/29 |
| 6,065,798 A | 5/2000 | Sankrithi | |
| 6,089,639 A * | 7/2000 | Wojnowski | B60R 11/06 296/37.6 |
| 6,454,178 B1 | 9/2002 | Fusco et al. | |
| 7,048,320 B2 * | 5/2006 | Rubel | B60R 7/02 296/37.6 |
| 8,925,777 B1 * | 1/2015 | Casucci | B60R 9/065 224/404 |
| 9,004,567 B2 | 4/2015 | Gerhardt et al. | |
| 9,193,290 B2 * | 11/2015 | Lazarevich | B60P 3/14 |
| 9,409,525 B2 * | 8/2016 | Gillam | B62D 33/023 |
| 10,087,671 B2 | 10/2018 | Linden et al. | |

(Continued)

FOREIGN PATENT DOCUMENTS

WO    2008151087 A2    12/2008

*Primary Examiner* — Derek J Battisti
(74) *Attorney, Agent, or Firm* — Vichit Chea; Price Heneveld LLP

(57) ABSTRACT

A storage module connects to a frame forming a door opening of a vehicle. The storage module includes a housing conforming to the door opening and extending into the compartment in an installed configuration. The storage module further includes an exterior panel disposed on a first side of the housing. The exterior panel conforms to an exterior surface of the vehicle enclosing the door opening. At least one storage compartment is disposed inside the housing and the compartment in the installed configuration. The storage compartment includes an access panel forming a portion of the exterior surface and forms a first storage volume.

18 Claims, 10 Drawing Sheets

(56) References Cited

U.S. PATENT DOCUMENTS

| | | | |
|---|---|---|---|
| 10,239,567 B1* | 3/2019 | Parrish | B62D 33/08 |
| 11,305,823 B2* | 4/2022 | McKinney | B60R 13/01 |
| 2006/0219746 A1* | 10/2006 | Kniffel | B60R 9/00 |
| | | | 224/404 |
| 2009/0127305 A1* | 5/2009 | Ropp | B60R 9/00 |
| | | | 224/404 |
| 2022/0063505 A1* | 3/2022 | Salter | B60R 7/046 |

* cited by examiner

SYSTEM AND METHOD FOR MODULAR VEHICLE STORAGE

FIELD OF THE INVENTION

The present invention generally relates to a storage system for vehicles and, more particularly, to an interchangeable storage system for passengers and goods.

BACKGROUND OF THE INVENTION

Modern vehicles are often identified in accordance with their associated purpose. For example, vehicles are commonly designed to provide selected features suited to passenger transport or the hauling and transportation of goods. Accordingly, when the use of a vehicle changes from day-to-day, the features of the vehicle may not beneficially change to suit the adjusted purpose of use for the vehicle. This disclosure provides for systems and methods that improve the flexible use of vehicles to suit their changing applications.

SUMMARY OF THE INVENTION

According to one aspect, the disclosure provides for a storage module that connects to a frame forming a door opening of a vehicle. The storage module includes a housing conforming to the door opening and extending into a compartment of the vehicle in an installed configuration. The storage module further comprises an exterior panel disposed on a first side of the housing, the exterior panel conforming to an exterior surface of the vehicle enclosing the door opening. At least one storage compartment is disposed inside the housing and the compartment in the installed configuration. The storage compartment comprises an access panel forming a portion of the exterior surface and forms a first storage volume.

Embodiments of the disclosure can include any one or a combination of the following features:
- the exterior panel of the storage module interchangeably replaces a door of the vehicle;
- wherein the at least one storage compartment comprises at least one of a drawer and a cabinet;
- the storage module connects to a door latch of the door of the vehicle in the installed configuration;
- the storage module occupies a portion of the compartment including a portion of a passenger seat in the installed configuration;
- a first locating mechanism forming a mating assembly between a first locator in connection with a floor portion of the passenger compartment and a second locator in connection with a second side of the housing;
- the second side opposes the first side and extends into the passenger compartment in the installed configuration;
- the first locator comprises a bracket forming a receiving opening in connection with the floor portion and the second locator forms a protrusion forming an exterior profile complementary to the receiving opening;
- the first locator slidably engages the second locator positioning the storage module in a first direction;
- a second locating mechanism comprising a hinge mounting bracket in connection with the storage module, wherein the hinge attachment bracket forms a mating assembly with at least one hinge of the vehicle that alternatively connects to the door;
- the exterior panel comprises an inner surface opposing the exterior surface, the inner surface in connection with the housing, and wherein the hinge attachment bracket is in connection with at least one of the housing and the inside surface;
- the at least one storage compartment further comprises at least one cabinet comprising an access door forming a portion of the exterior surface, the at least one cabinet further comprising a second storage volume separate from the first storage volume, the second storage volume disposed inside the housing; and
- the storage module comprises a folding cart comprising a plurality of legs pivotably mounted to a base of the housing, wherein the legs fold between the base and the floor portion in the installed configuration.

According to another aspect of the present invention, a method for installing a vehicle storage module is disclosed. The method comprises removing a door of a vehicle, the door enclosing an opening into a passenger compartment and inserting the storage module into the door opening, such that the storage module occupies a portion of the passenger compartment. The method further comprises connecting a wiring harness between the vehicle and the storage module and communicating an operating configuration of the storage module via the wiring harness. The storage module is secured to a hinge assembly of the door along a first side of the opening.

Embodiments of the disclosure can include any one or a combination of the following features:
- detecting an alignment of the storage module in the compartment with a locating device and, in response to detecting the alignment, activating a door latch of the vehicle securing the storage module within the opening along a second side of the opening opposite the hinge assembly;
- the operating configuration of the storage module comprises at least one of a storage configuration identifying a plurality of storage compartments and a climate control configuration identifying a temperature within the storage compartment(s);
- in response to receiving the operating configuration, detecting connection verification signals identifying at least one of the connection of the hinge assembly and a closure of the door latch; and
- adjusting a position of a passenger seat accessed via the door vacating the portion of the passenger compartment in which the storage compartment is inserted.

In yet another aspect, the disclosure provides for a vehicle comprising an interchangeable storage module. The vehicle comprises a frame forming a door opening to a compartment of the vehicle. The door opening is enclosed by an access door. The vehicle further comprises a storage module interchangeable with the access door. The storage module comprises a housing including an exterior profile conforming to the door opening. The housing extends into the compartment in an installed configuration. The storage module further comprises an exterior panel disposed on a first side of the housing. The exterior panel conforms to an exterior surface of the vehicle and encloses the door opening of the vehicle and at least one storage compartment comprising an access panel forming a portion of the exterior surface.

The at least one storage compartment forms a first storage volume disposed inside the housing and the compartment in the installed configuration. The storage module further comprises at least one locator bracket comprising a first locating device that outputs a first locating signal identifying a position of the storage module in the vehicle and an electronic door latch in connection with the vehicle and comprising a closure mechanism. A controller identifies an installation status of the storage module in response to the locating signal and activates the closure mechanism of the electronic door latch securing the storage module to the vehicle in response to the locating signal. The locator bracket comprises at least one of a locator assembly in connection with a floor portion in the compartment of the vehicle and a door hinge assembly of the access door in connection with the frame proximate to the door opening.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6A is a detailed view of a hinge assembly demonstrating detail A introduced in

FIG. 4;

FIG. 6B is a detailed view of a hinge assembly demonstrating detail A introduced in

FIG. 4;

DETAILED DESCRIPTION OF THE PREFERRED EMBODIMENTS

Figure 1:
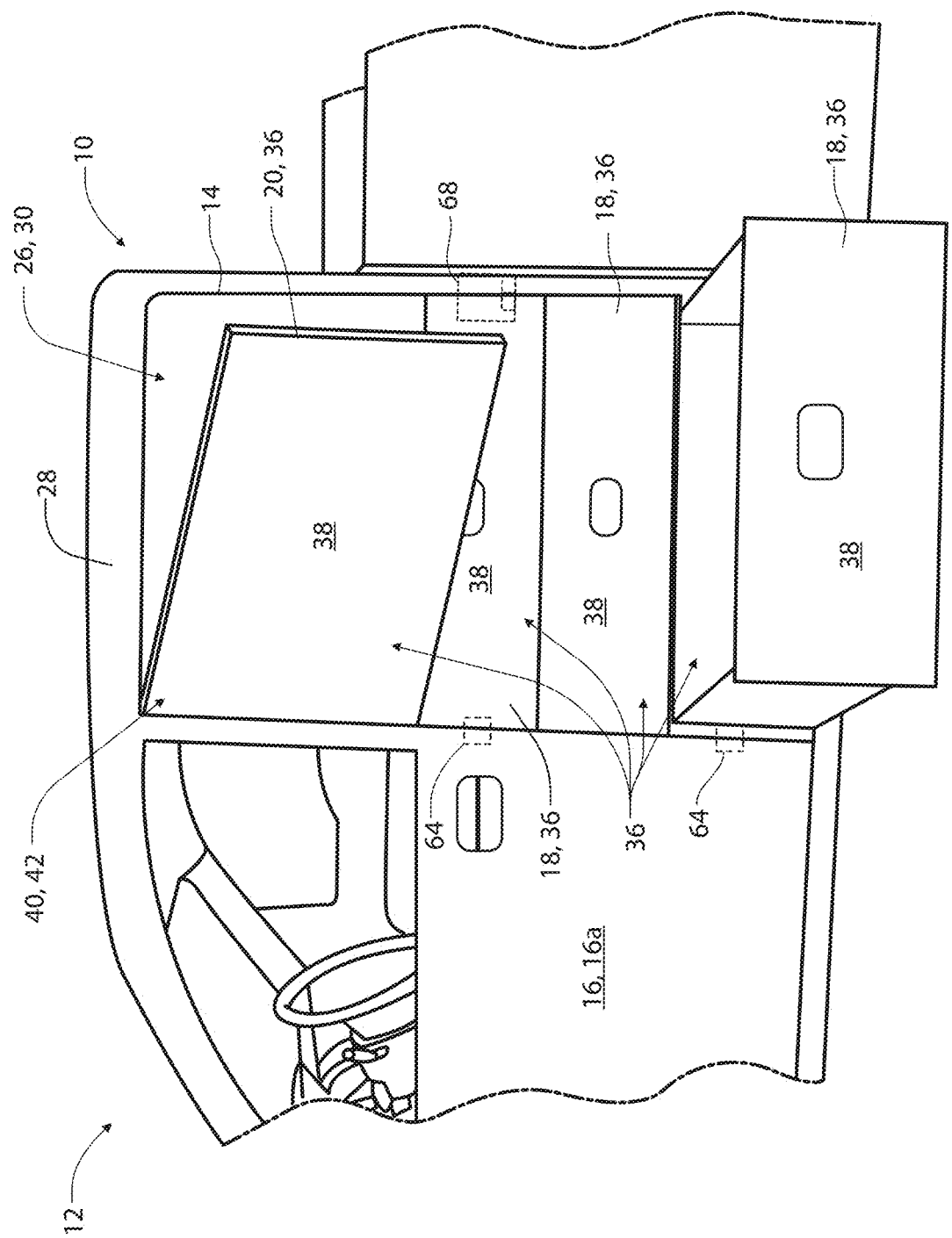
FIG. 1 is a projected view of a vehicle demonstrating an interchangeable storage system.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations unless otherwise specified.

Figure 2:
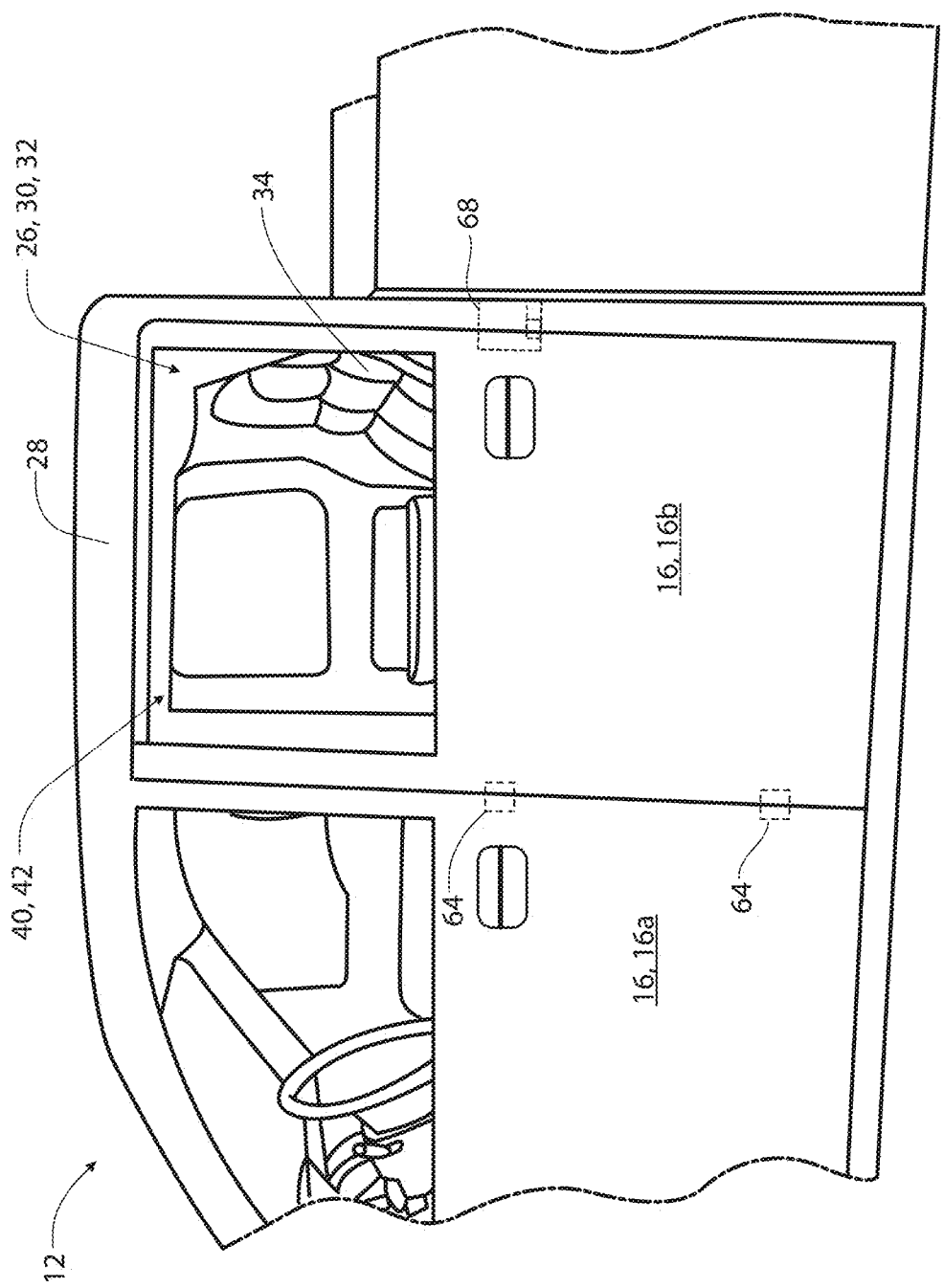
FIG. 2 is a projected view of a vehicle demonstrating a removable passenger door compatible with an interchangeable storage system.
Figure 3:
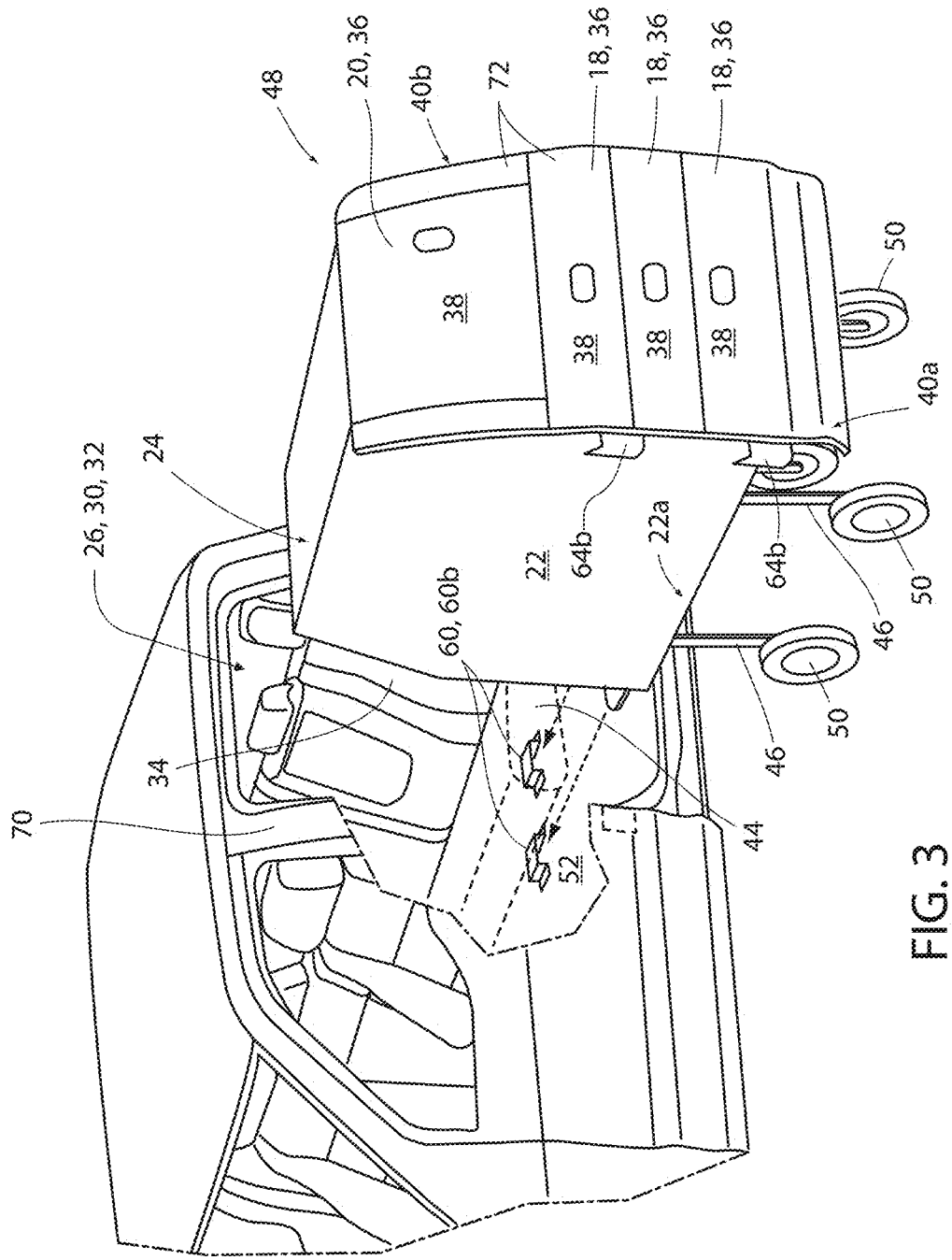
FIG. 3 is a projected view of a vehicle demonstrating the installation of a storage module.

Referring generally to FIGS. 1, 2, and 3, an interchangeable storage system 10 for a vehicle 12 is shown. The system 10 may include one or more interchangeable storage modules 14 that may be exchanged with one or more access doors 16 of the vehicle 12. In various embodiments, the storage module 14 may include one or more general storage spaces or volumes (e.g., drawers 18, cabinets 20) disposed within a housing 22. As further discussed herein, the housing 22 includes an exterior profile shape 24 that is complementary to a door opening 26 formed by a chassis or body 28 of the vehicle 12. In this configuration, the housing 22 of the storage module 14 can be interchangeably installed to occupy an interior volume 30 of a compartment 32 of the vehicle 12, which may otherwise be occupied by a passenger seat 34. Accordingly, the disclosure provides for a modular configuration for the interior volume 30 of the vehicle 12 to better serve the changing needs of a user of the vehicle 12. The examples of the disclosure shown are discussed in reference to the vehicle 12 in the form of a truck; however, it shall be understood that the system 10 may be implemented in various types of passenger vehicles.

As depicted in FIG. 1, the storage module 14 includes three of the drawers 18 and a single cabinet 20, which will more generally be referred to as storage compartments 36 for clarity. In order to suit the needs of the user of the vehicle 12, the configuration of the storage compartments 36 may widely vary. Some specific applications of the system 10 and related features are further discussed in reference to FIGS. 7A, 7B, and 9. In general, each of the storage compartments 36 may be accessible via an access panel 38, which may include mechanical and/or electro-mechanical latches to provide access to each of the compartments 36. The access panels 38 may form an exterior surface 40 of the vehicle 12 corresponding to that otherwise occupied or enclosed by the access door 16 (e.g., rear passenger door as depicted). Accordingly, the access panels 38 forming the exterior surface 40 may follow and mimic exterior surface profiles of the vehicle 12 that extend along the body 28 (e.g. the frame or chassis) from a first access door 16a to a second access door 16b. In this way, the exterior surface 40 of the storage module 14 may provide similar aerodynamic or aesthetic properties as the access door 16.

As depicted in FIG. 3, the second door 16b of the vehicle 12 may be removed, such that the exterior profile shape 24 of the housing 22 can be inserted into the interior volume 30 of the compartment 32 of the vehicle 12. By inserting the storage module 14 into the vehicle 12 as shown, the storage module 14 may be arranged in the installed position as depicted in FIGS. 1 and 7B. In addition to the removal of the access door 16, all or a portion of the passenger seat 34 may be removed or adjusted, such that the exterior profile shape 24 of the housing 22 has adequate clearance within the interior volume 30 of the vehicle 12 to receive the storage module 14. As demonstrated in FIG. 3, a deck portion 44 of the passenger seat 34 is removed to provide clearance for the installation of the storage module 14. As later discussed in reference to FIG. 4, the deck portion 44 may be rearranged or adjusted into a stowed or folded position to provide clearance for the storage module 14.

With the second door 16b of the vehicle 12 removed from the body 28, the storage module 14 may be aligned for installation. To support the weight of the storage module 14, a plurality of folding legs 46 are connected to a base portion 22a of the housing 22. In this configuration, the folding legs 46 in connection with the storage module 14 may provide for a portable cart 48 supported by a plurality of wheels 50 allowing for transport of the storage module 14 from storage to installation within the vehicle 12. To further accommodate the installation of the housing 22 into the interior volume 30 of the compartment 32, the folding legs 46 may be of a length suitable to align an elevation of the base portion 22a of the storage module 14 with a floor portion 52 to easily be inserted into the vehicle 12 within the door opening 26. In this way, the portable cart 48 may provide for the installation of the storage module 14 by a single person without requiring specialized tools for installation and/or removal.

To align the housing 22 of the storage module 14 within the compartment 32 of the vehicle 12, the system 10 may include one or more locator and/or positioning assemblies. For example, as demonstrated in FIG. 3, the system 10 may include a locator assembly 60 configured to align one or more protrusions 60a in connection with the base portion 22a of the housing 22 with the floor portion 52 of the compartment 32 of the vehicle 12. As depicted, the protrusions 60a or first locators of the locator assembly 60 slide along the floor portion 52 during installation and slidably engage a receiving opening formed by the bracket 60b or a second locator of the locator assembly 60. In this configuration, the locator assembly 60 may provide for physical alignment of the housing 22 within the interior volume 30, as well as structural engagement between the storage module 14 and the vehicle 12 to prevent movement of the storage module 14 in a fore/aft direction of the vehicle 12. The protrusions 60a and corresponding brackets 60b may further provide for alignment of the storage module 14 with a hinge assembly 64 and/or a latch assembly 68, as further discussed herein.

Figure 4:
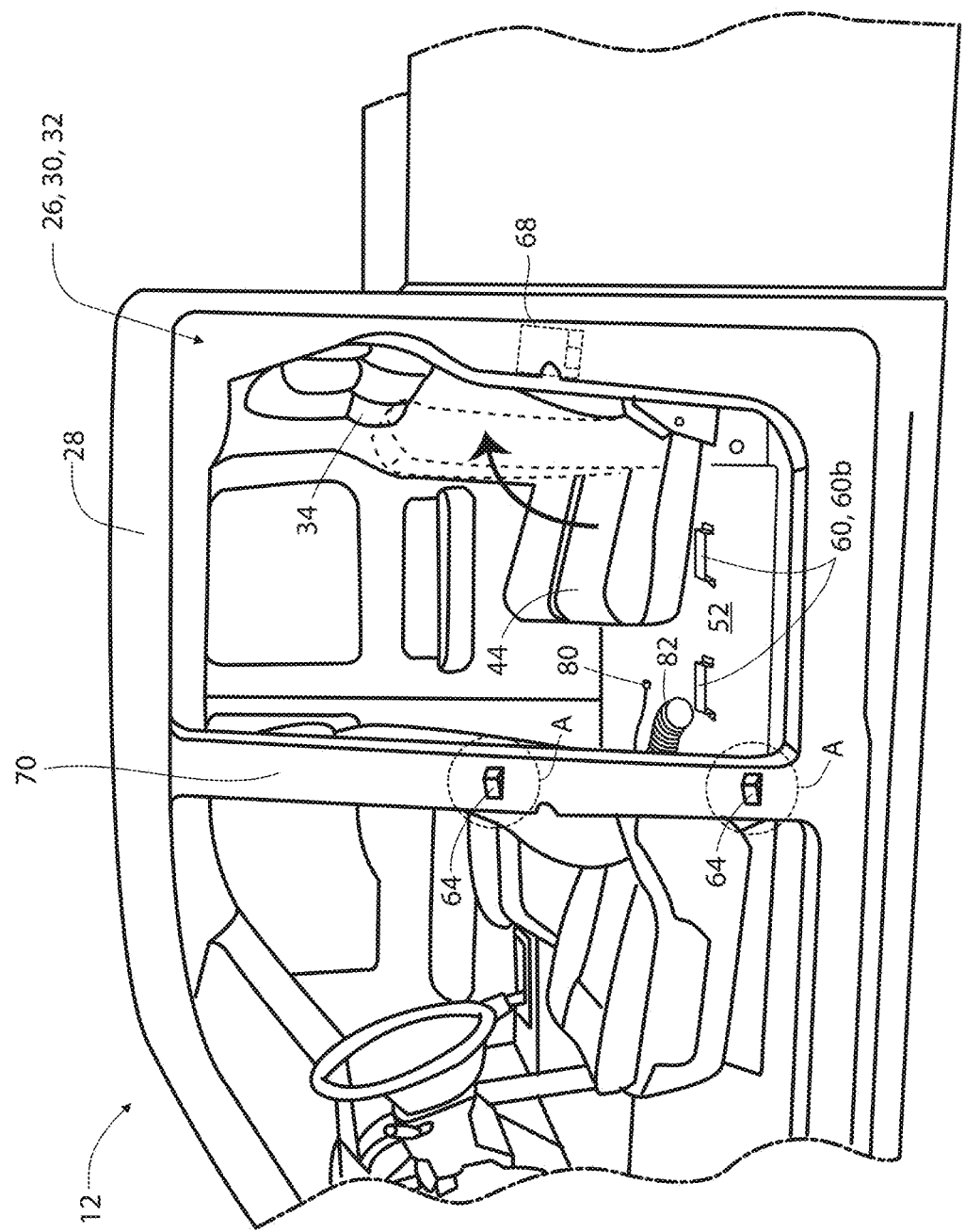
FIG. 4 is a projected view of a vehicle demonstrating a body forming a door opening that receives a storage module that is interchangeable with a passenger door.
Figure 5:
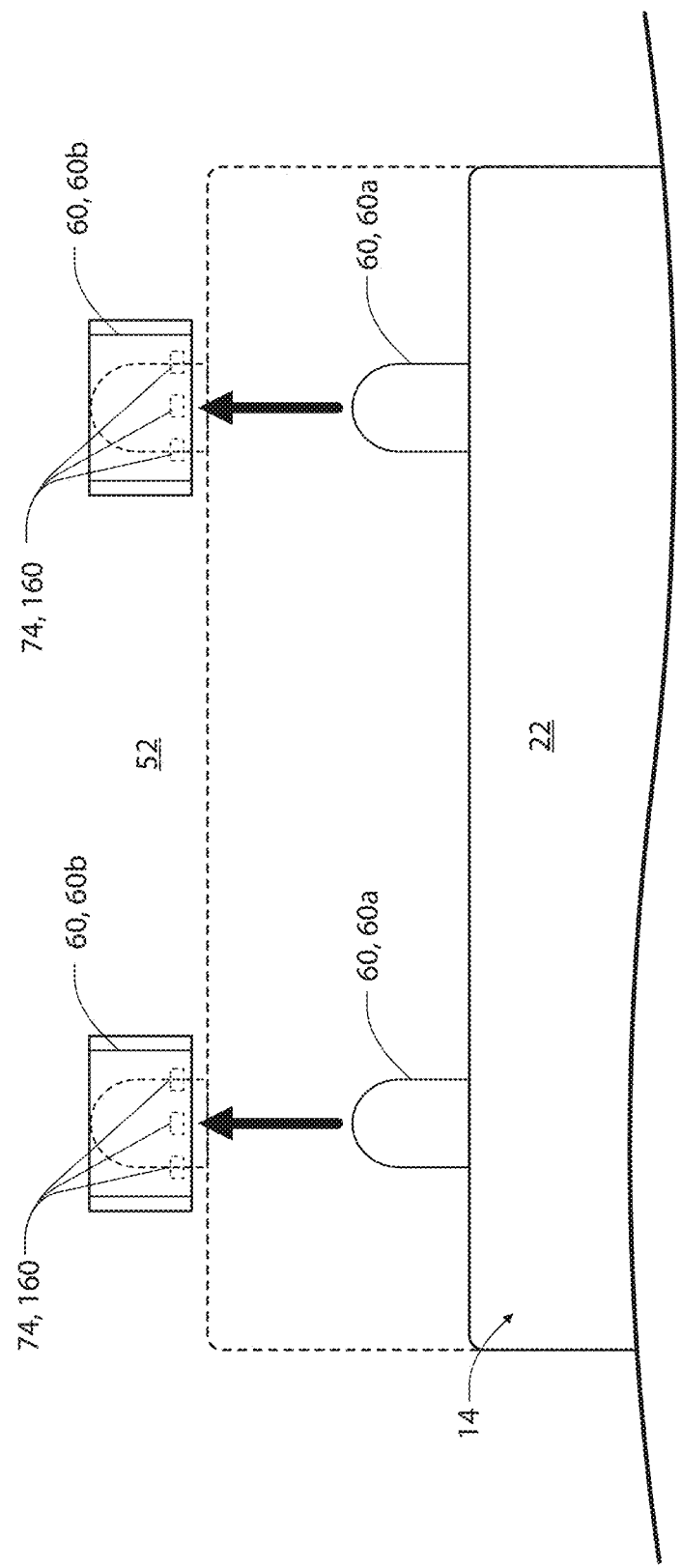
FIG. 5 is a top detailed view of a locator assembly of the storage module demonstrating an alignment with a locator bracket positioned on a floor portion of a passenger compartment.

Referring now to FIGS. 3, 4, 5, and 6, an exemplary implementation of the installation of the storage module 14 is described in further detail. First, in order to clear the door opening 26, the second door 16b of the vehicle 12 may be removed. The removal of the second door 16b may require that the first door 16a (e.g., a forward door) be opened to expose a pillar 70 or portion of the body 28 to which the hinge assembly 64 is attached (FIG. 4). With the second door 16b removed from the vehicle 12, the door opening 26 formed by the body 28 may be clear for installation of the storage module 14. Additionally, the deck portion 44 of the passenger seat 34 may be stowed, as depicted, and/or removed from the compartment 32. In this configuration, the interior volume 30 of the compartment 32 may be vacated, such that the compartment 32 is open to receive the housing 22 of the storage module 14.

Figure 6B:
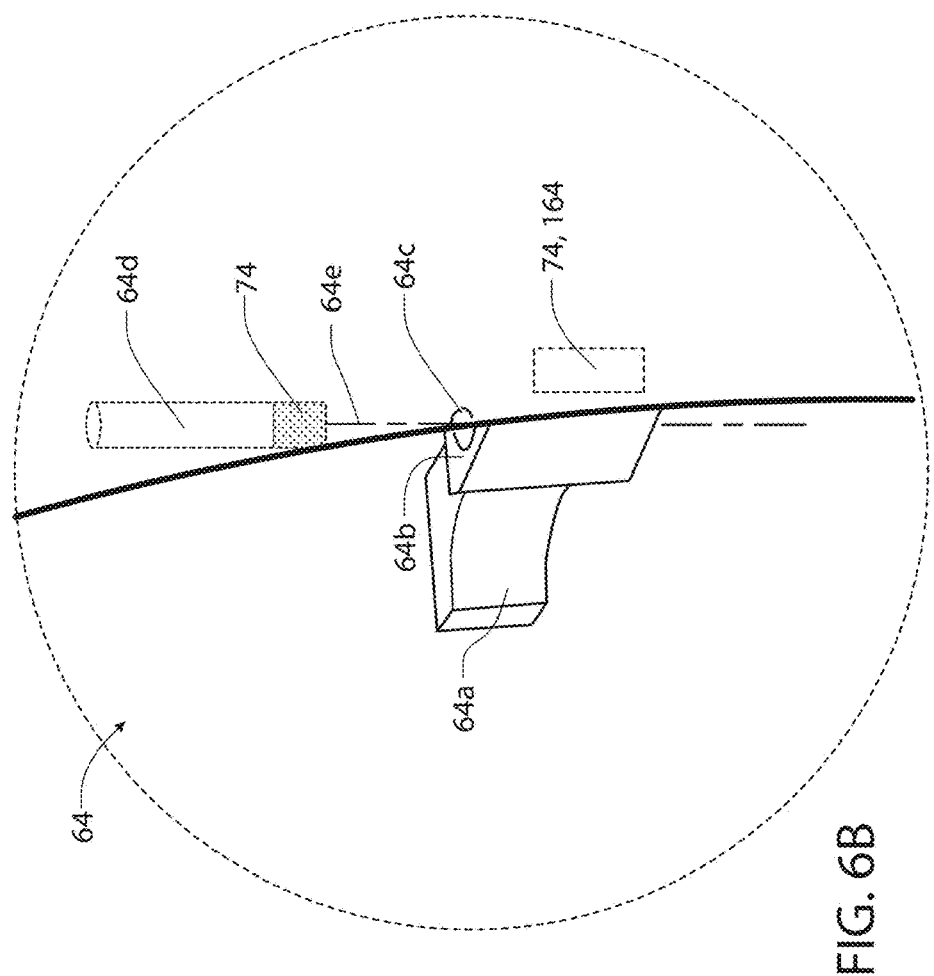
Figure 6A:
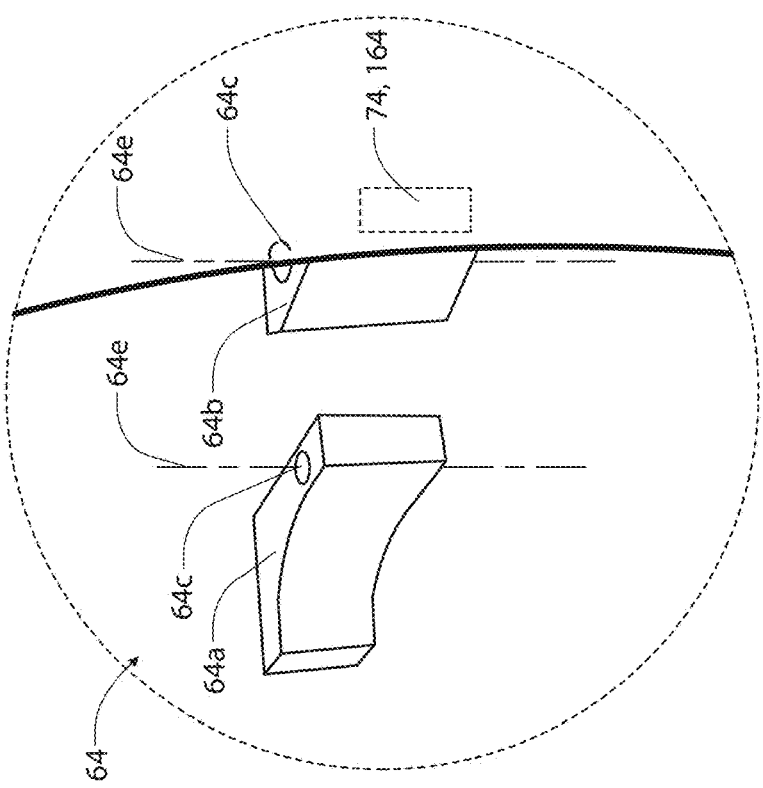

Once the housing 22 is inserted into the interior volume 30 via the door opening 26, the protrusions 60a of the locator assembly 60 may slidably engage the brackets 60b connected to the floor portion 52 of the vehicle 12. The sliding engagement of the protrusions 60a engaging the brackets 60b of the locator assembly 60 is shown in detail in FIG. 5. The alignment of the protrusions 60a within the brackets 60b may further provide for alignment of a body hinge bracket 64a with a door or storage module hinge bracket 64b, as depicted in FIGS. 6A and 6B. The body hinge bracket 64a and the storage module hinge bracket 64b form a locating pin aperture 64c configured to receive a hinge pin 64d when aligned along a hinge axis 64e. With the hinge pin 64d installed in the locating pin aperture 64c, which extends through each of the brackets 64a and 64b, the storage module 14 may be fixed to the body 28 of the vehicle 12 along a first side 40a of the storage module 14.

Proximate to a second side 40b of the exterior surface 40, the storage module 14 may be connected to the vehicle 12 via a latch assembly 68. The latch assembly 68 may correspond to a conventional door latching mechanism comprising a striker that engages a rotary latch. In some embodiments, the latch assembly 68 may alternatively correspond to a power latch assembly that tightens and secures the second side 40b of the storage module 14 to the vehicle 12 via an electro-mechanical device. The electromechanical device may cinch and draw the storage module 14 or the second door 16b tightly to the vehicle 12. An example of a powered latch that may be implemented to secure the storage module 14 is described in further detail in U.S. Pat. No. 10,087,671 B2, entitled "POWERED DRIVEN DOOR PRESENTER FOR VEHICLE DOORS," the disclosure of which is incorporated herein by reference in its entirety. A perimeter 72 of the exterior surface 40 of the storage module 14 extending proximate to the door opening 26 may comprise a seal in the form of weather stripping similar to the second access door 16b, such that the storage module 14 may be sealably secured to the vehicle 12.

To ensure that the storage module 14 is securely connected to the vehicle 12, the system 10 may further comprise a plurality of presence and/or proximity sensors referred to herein as locating sensors 74 for clarity. Each of the locating sensors 74 may correspond to capacitive, inductive, magnetic, and/or optical sensors that may detect the mechanical engagement of the locator assembly 60, the hinge assembly 64, and/or the latch assembly 68. In reference to the locator assembly 60, as demonstrated in FIG. 5, a plurality of the locating sensors 74 are distributed along a width of the bracket 60b to identify a lateral engagement of the protrusion 60a within the bracket 60b. In operation, each of the locating sensors 74 (e.g., three locating sensors in each bracket 60b as depicted) is in communication with a controller of the storage system 10. In this configuration, locating signals from each of the locating sensors 74 may be received by the controller and identify the engagement of the protrusions 60a with the brackets 60b. In response to identifying the engagement and alignment of the locator assembly 60, the controller may identify a partially secured status of the storage module 14 and, in some cases, may activate a cinching mechanism of the latch assembly 68 to further secure the storage module 14 to the vehicle 12.

Referring now to FIGS. 6A and 6B, a locating sensor 74 may further detect the engagement of the hinge pin 64d within the locating pin aperture 64c of the hinge assembly 64. The locating sensor 74 may be in connection with the body hinge bracket 64a or the storage module hinge bracket 64b and may communicate a locating signal identifying the condition of the hinge pin 64d in the hinge assembly 64 to the controller. As depicted in FIG. 6B, in some implementations, an additional sensor may be disposed in a portion of the hinge pin 64d. The sensor may correspond to a low energy capacitive sensor that detects the status of the hinge pin 64d in the hinge assembly 64 and may further comprise a communication module, which may be in the form of a Bluetooth® low energy communication circuit or similarly capable wireless antenna to communicate the status detected by the sensor disposed in the hinge pin 64d. The communication module may be battery-powered such that the hinge pin 64d can easily be removed. Accordingly, the system 10 provides for a verification that the hinge pin 64d is installed in the hinge assembly 64 and communicates the verification to the controller to ensure secure installation of the storage module 14.

Referring again to FIG. 4, the second side 40b of the exterior surface 40 of the storage module 14 maybe secured to the latch assembly 68. As previously discussed, the latch assembly 68 may generally comprise a rotary latch and striker mechanism that secures the storage module 14 to the vehicle 12 similar to the second access door 16b. In some implementations, the latch assembly may correspond to a powered latch, which may include a pivoting claw. The pivoting claw connects to an electro-mechanical actuator that rotates the pivoting claw to engage the striker and draw the second door 16b or the storage module 14 to sealably engage the door opening 26 of the vehicle 12.

Figure 9:
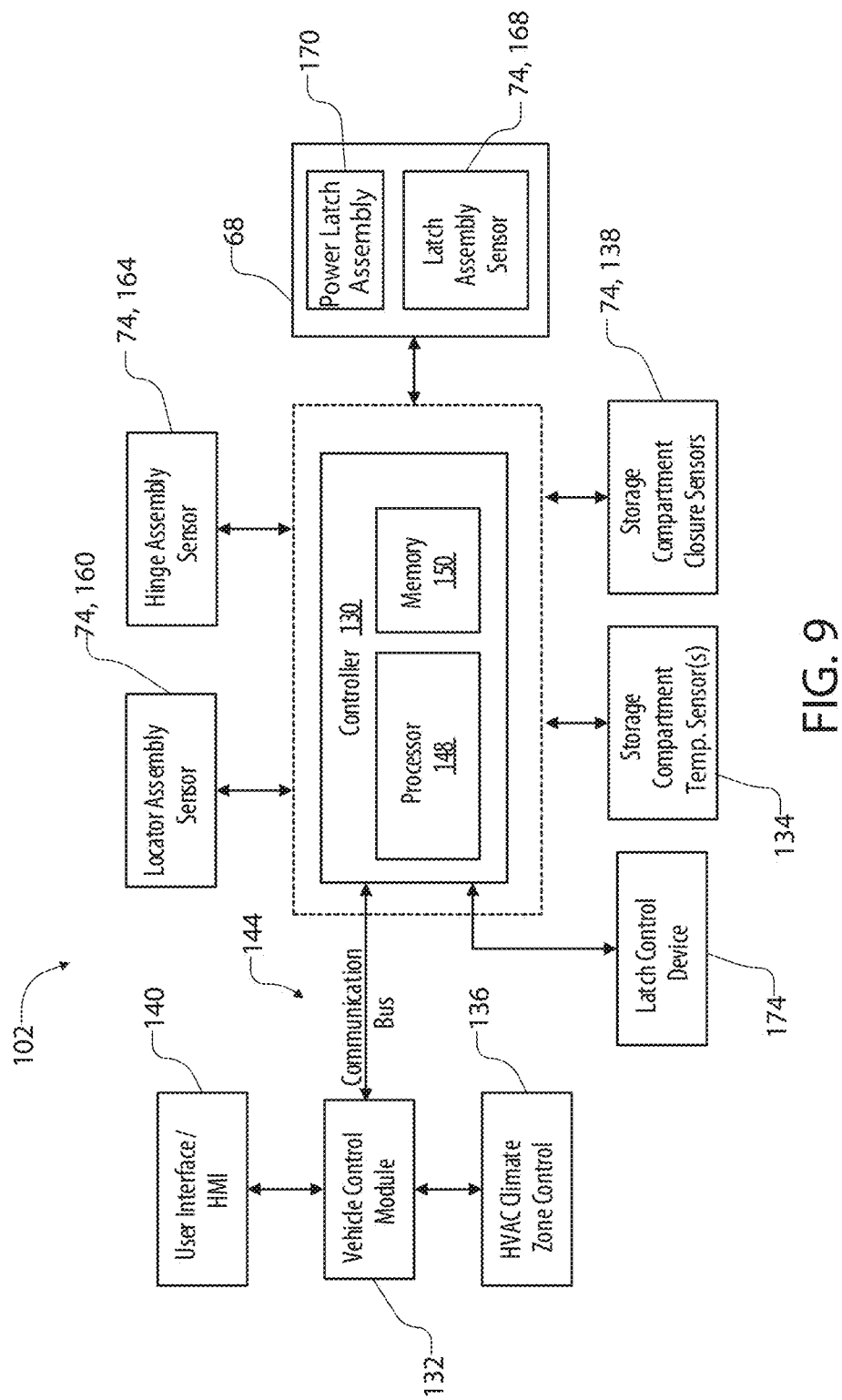
FIG. 9 is a block diagram demonstrating a controller for an interchangeable storage system in communication with a vehicle control module in accordance with the disclosure.

As discussed herein, each of the locating sensors 74 may be in communication with a controller, the details of which are further discussed in reference to FIG. 9. As depicted in FIG. 4, the controller of the system 10 may communicate with a vehicle control module, such that various features and operational aspects of the storage system 10, including its installation and configuration of the storage compartments 36, may be communicated between the vehicle control module and the controller of the system 10. In order to provide such communication, a wiring harness 80 may extend from the floor portion 52 or a center console of the vehicle 12 and communicatively couple the controller of the storage module 14 with the vehicle control module. In this way, the status of each of the locating sensors 74, as well as a variety of additional status information (e.g., closure status of the storage compartments 36 or latch assemblies 90, temperature, malfunctions, etc.), may be communicated between the storage system 10 and the control module of the vehicle 12. Additionally, in some instances, a heating ventilation and air conditioning (HVAC) duct 82 may extend from the HVAC system of the vehicle 12 (e.g., a passenger compartment climate zone of an HVAC system of the vehicle 12) to an HVAC connection adapter of the storage module 14. In this configuration, hot, cold, or fresh ventilated air may be supplied from the HVAC system of the vehicle 12 into one or more of the storage compartments 36 of the storage module 14 to circulate air and/or control the temperature of the storage compartments 36 for various applications. Accordingly, the storage system 10 may provide for a variety of configurations and features that may not otherwise be available in a conventional vehicle.

Figure 7A:
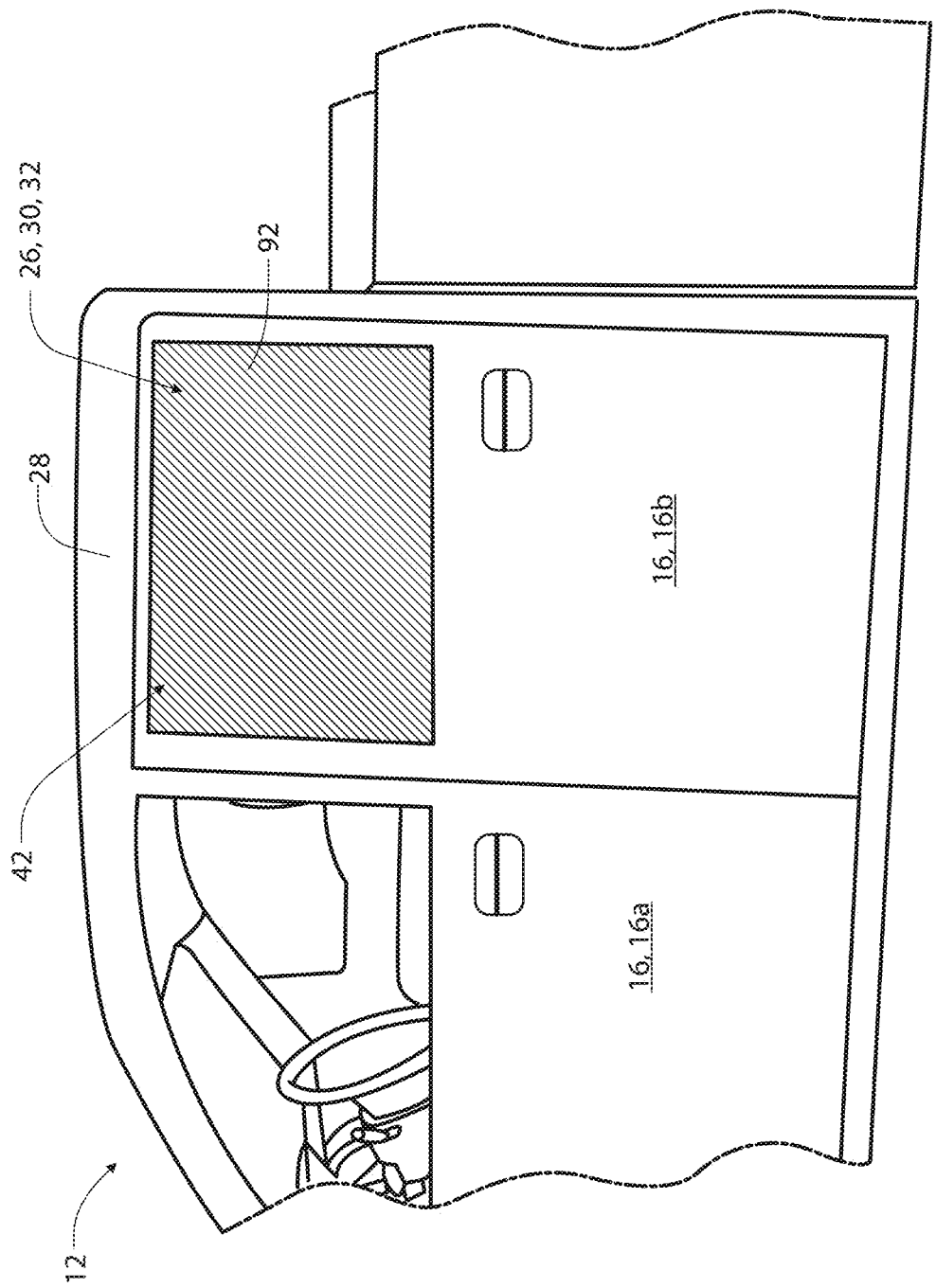
FIG. 7A is a projected view of a vehicle demonstrating an exterior surface of a passenger door.
Figure 7B:
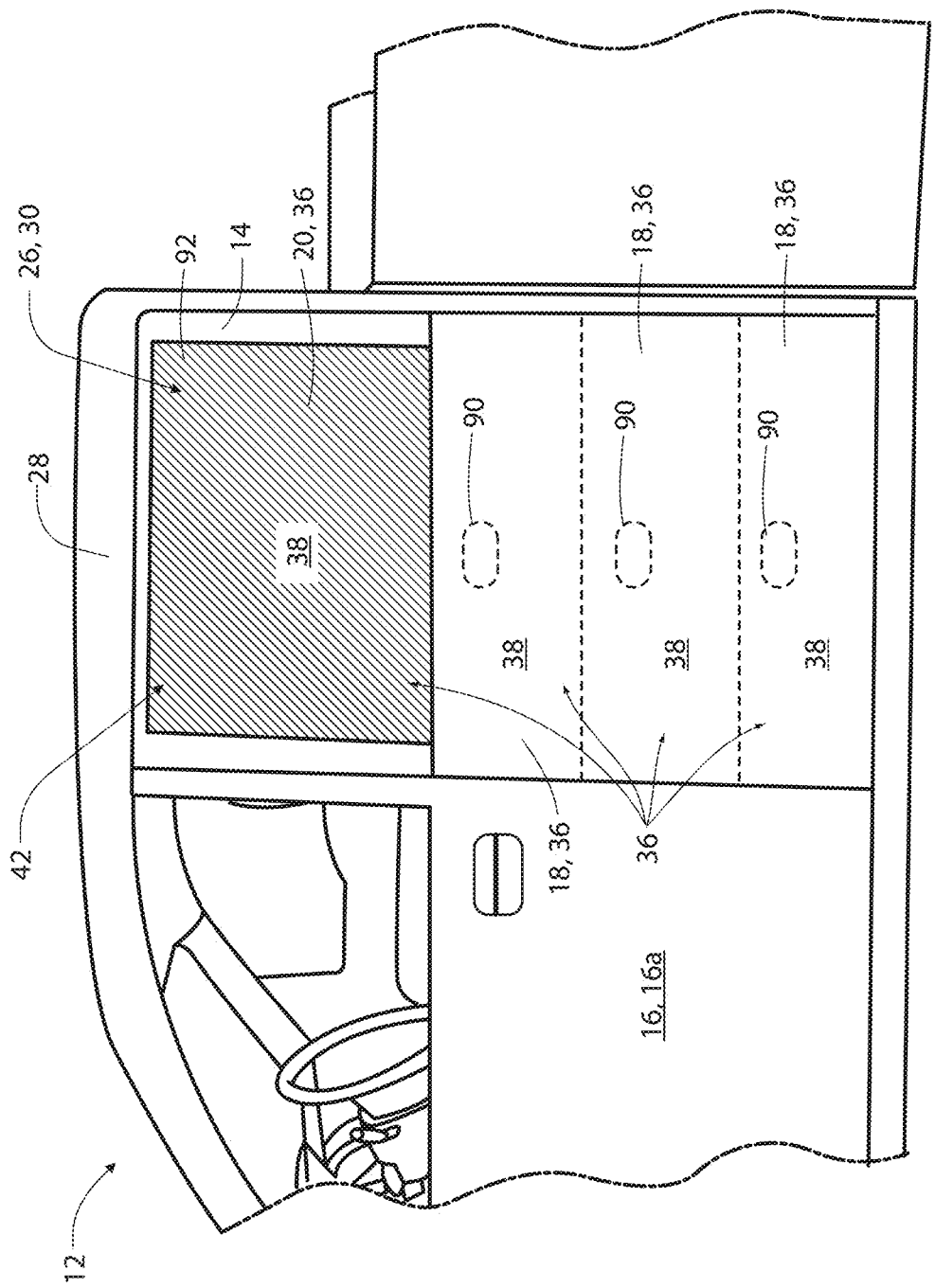
FIG. 7B is a projected view of a vehicle demonstrating an exterior surface of a storage module camouflaged to mimic a passenger door.

Referring to FIGS. 7A and 7B, in some instances, the exterior surface 40 of the storage module 14 may form contours and/or have color and decals that mimic the appearance of the second access door 16b of the vehicle 12. As previously discussed, the exterior surface 40 may be designed to conform to the exterior profiles 42 of the vehicle, such that the storage module 14 maintains the same or equivalent aerodynamic structure and aesthetic appearance as the second door 16b. Additionally, the exterior surface 40 of the storage module 14 may be painted and/or include panels or decals 92 designed to mimic the appearance of the second access door 16b or otherwise mask the appearance of the access panels 38 associated with the storage compartments 36. As shown in FIG. 7B, latch assemblies 90 associated with each of the storage compartments 36 are represented with hidden lines illustrating the appearance of the exterior surface 40 without exposed latch assemblies 90. In some cases, the latch assemblies 90 may be electronically controlled via a user interface or HMI of the vehicle 12 that may communicate with a controller of the system 10 via the wiring harness 80. In some examples, the latch assemblies 90 may be hidden in a cavity disposed between the first access door 16a and the housing 22 of the storage module 14 along the first side 40a of the exterior surface 40. In such examples, the outward appearance of the exterior surface 40 of the storage module 14 may be masked or camouflaged to mimic the appearance of the second access door 16b to maintain the aesthetics of the vehicle 12 and/or disguise the storage compartments 36 for security purposes.

Figure 8:
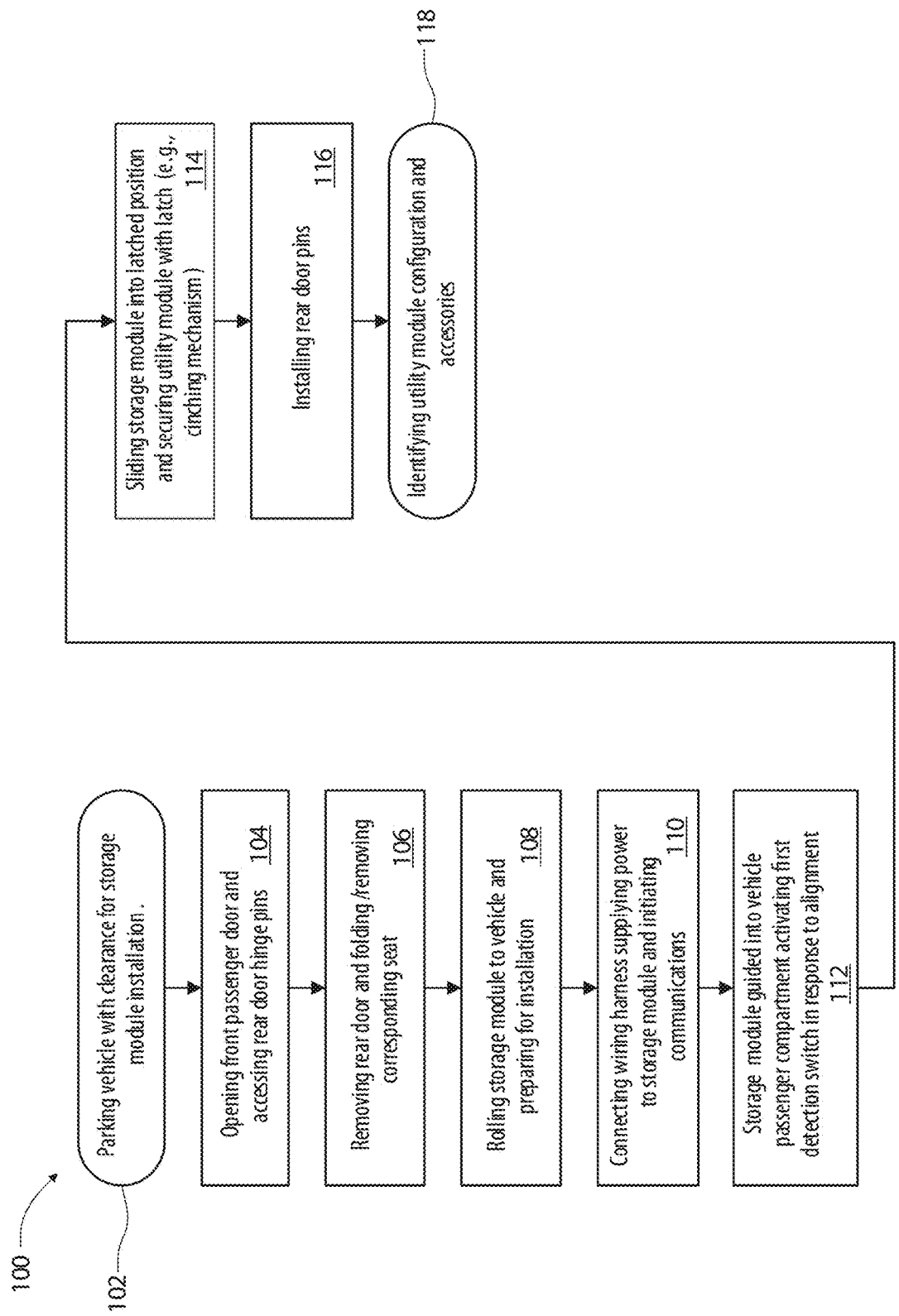
FIG. 8 is a flow chart demonstrating a method for implementing an interchangeable storage system.

Referring now to FIG. 8, a flow chart demonstrating a method 100 for installing the storage module 14 in the door opening 26 of the body 28 of the vehicle 12 is shown. The method 100 may begin with step 102 by first ensuring that the vehicle is parked with adequate clearance for installation of the storage module 14 and removal of the second access door 16b. The installation of the storage module 14 may begin by opening the first door 16a or a forward passenger door as depicted in the exemplary embodiments discussed herein, such that the hinge assembly 64 is accessible (104). Once accessed, the hinge pin 64d may be removed from the hinge assembly 64 and the second door 16b may be removed from the vehicle 12 (106). In addition to removing the second door 16b, the passenger seat 34 accessed via the second door 16b may be folded into a stowed position and/or removed from the vehicle 12, such that the interior volume 30 of the compartment 32 is available for installation of the storage module 14.

Once the vehicle 12 is prepared for installation following step 106, the storage module 14 may be installed into the interior volume 30 by rolling the housing into alignment and inserting the housing 22 into the door opening 26 utilizing the support of the portable cart 48 (108). Once the storage module 14 is positioned within the vehicle 12, the wiring harness 80 and the HVAC duct 82 may be connected between the vehicle 12 and the storage module 14 (110). The connection of the wiring harness 80 may supply power to the storage module 14 and initiate communications between the controller of the system 10 and the vehicle control module to ensure proper installation. Following step 110, the storage module 14 may be guided into the interior volume 30 of the compartment 32 activating a first locating signal of the locating sensors 74 indicating the engagement of the protrusions 60a of the locator assembly 60 with the corresponding brackets 60b disposed in the compartment 32 (112). Once positioned within the locator assembly 60, the storage module 14 may further be secured to the vehicle via a latch assembly 68 (114). In some cases, the latch assembly 68 cinches the storage module 14 securely to the body 28 of the vehicle 12 about the door opening 26, such that the weather stripping or seal of the storage module 14 sealably engages the body 28 of the vehicle 12. The successful engagement of the latch assembly 68 may further be communicated by the locating sensors 74 to a controller of the system 10, as well as the vehicle control module, to demonstrate the proper installation of the storage module 14.

With the first door 16a still open, the hinge assembly 64 including the body hinge bracket 64a and the storage module hinge brackets 64b may still be accessible along the first side 40a of the storage module 14. Accordingly, the hinge pin 64d or multiple hinge pins may be installed in the locating pin aperture 64c securing the first side 40a of the storage module 14 to the vehicle 12 (116). Upon installation of the hinge pin 64d, the corresponding locating sensor 74 may identify the secure installation of the hinge pin 64d confirming the engagement of the hinge assembly 64. Accordingly, based on the locating signals associated with the locator assembly 60, the hinge assembly 64, and/or the latch assembly 68, the controller of the system 10 may identify the secure installation of the storage module 14 in connection with the vehicle 12. Following this identification, the controller of the system 10 may continue to communicate with the vehicle control module identifying the operating configuration of each of the features and accessories corresponding to the storage compartments 36 and various other utilities that may be implemented with the storage system 10 (118).

Referring now to FIG. 9, a block diagram of the interchangeable storage system 10 is shown in connection with the vehicle 12. As previously discussed, the system 10 comprises a controller 130. The controller 130 may be in communication with each of the locating sensors 74 associated with each of the locator assembly 60, the hinge assembly 64, and the latch assembly 68, such that the secured installation of the storage module 14 may be verified via a communication with the vehicle control module 132. In this way, the vehicle control module 132 may work in coordination with the controller 130 to restrict the operation of the vehicle 12 in response to a lack of confirmation of a secure installation. The communication may be achieved via the wiring harness 80 as previously discussed herein.

In addition to the verification of the secure installation, the controller 130 may additionally communicate an operating status of one or more of the storage compartments 36 to the vehicle control module 132. For example, in response to a temperature signal from a temperature sensor 134 (FIG. 9) that represents a temperature proximate to the temperature sensor 134 in one or more of the storage compartments 36, the vehicle control module 132 may communicate with an HVAC climate zone controller 136 of an HVAC system of the vehicle in connection with the HVAC duct 82. Accordingly, in response to the temperature signal, the controller 130 may communicate heating, cooling, or ventilation instructions to the vehicle control module 132, such that the temperature of the storage compartments may be controlled according to the instructions via the HVAC climate zone controller. An example of an HVAC climate zone controller is further described in U.S. Pat. No. 6,454,178 B1 entitled, "ADAPTIVE CONTROLLER FOR AN AUTOMOTIVE HVAC SYSTEM," the disclosure of which is incorporated herein by reference in its entirety.

In some instances, the controller 130 may further be in communication with a plurality of closure sensors 138 configured to identify a closure status of one or more of the compartments 36. In response to an ajar status of one or more of the compartments 36, the controller 130 may communicate an insecure or ajar status of the storage module 14 to the vehicle control module 132, which may consequently display one more notifications on a human-machine interface (HMI) 140 of the vehicle 12 and/or restrict the operation of the vehicle 12. The HMI 140 may correspond to an infotainment system located in a center stack or passenger console and may include a display with one or more softkeys or a touch screen interface. Accordingly, the status of various aspects of the storage module 14 including secure installation, closure or ajar status, temperature and corresponding climate control, a visual representation of the storage configuration, and/or various additional information may be displayed on the HMI 140.

As discussed herein, the controller 130 may be in communication with a vehicle control module 132 via a communication bus 144 of the vehicle 12. The communication bus 144 may deliver signals to the controller 130 identifying various vehicle states. For example, the communication bus 144 may communicate to the controller 130 a drive selection of the vehicle 12, an ignition state, an open or ajar status of the access doors 16, etc. The vehicle control module 132 may also communicate with HMI 140 to communicate status information identifying the operation of one or more features of the storage module 14. The controller 130 may comprise a processor 148 comprising one or more circuits that receive the signals from the communication bus 144 and output signals to control the features of the storage system 10 and communicate control and status instructions with the vehicle control module 132. The processor 148 may be in communication with a memory 150 that stores instructions to control the activation of various features of the storage module 14.

As previously discussed, the secure installation of each of the locator assembly 60, the hinge assembly 64, and the latch assembly 68 may be detected and communicated to the controller 130 based on locating signals communicated via each of the locating sensors 74. For clarity, the locating sensors 74 that detect the status of the locator assembly 60 may be referred to as the locator assembly sensor 160, the locating sensors 74 that detect the status of the hinge assembly 64 may be referred to as the hinge assembly sensor 164, and the locating sensors 74 that detect the status of the latch assembly 68 may be referred to as the latch assembly sensor 168. As discussed herein, the status of these sensors 160, 164, and/or 168 may be communicated from the controller 130 to the vehicle control module 132 to ensure secure installation.

As previously discussed, the latch assembly 68 may correspond to a conventional door latching mechanism comprising a striker that engages a rotary latch or a power latch assembly 170. The power latch assembly 170 may comprise an electro-mechanical actuator and a door cinch device configured to tighten and secure the second side 40b of the storage module 14 to the vehicle 12. The electromechanical device may cinch and draw the storage module 14 or the second door 16b tightly to the vehicle 12 and may be controlled by the controller 130 in response to the alignment detection of the locator assembly sensor 160 and/or the hinge assembly sensor 164. Additionally, the power latch assembly 170 may be released via a latch control device 174 and/or in response to a command received from the communication bus 144, which may be in response to a user input to the HMI 140. An example of a powered latch that may be implemented to secure the storage module 14 is described in further detail in U.S. Pat. No. 10,087,671 B2, entitled "POWERED DRIVEN DOOR PRESENTER FOR VEHICLE DOORS," the disclosure of which is incorporated herein by reference in its entirety.

The controller 130 may further be in communication with the latch control device 174, which may receive and communicate a control request of the latch mechanism of the latch assembly 68. The latch control device 174 may correspond to a user input device (e.g. an electromechanical switch, capacitive sensor, etc.) that communicates a request to latch or unlatch the latch assembly 68 from the storage module. In some implementations, the latch control device 174 may be integrated into the HMI 140 of the vehicle 12, such that the state of the latch assembly 68 may be centrally controlled via a user interface of the vehicle 12. Accordingly, the interchangeable storage system 10 may be flexibly implemented with integrated controls or dedicated controls to provide a solution suited to a variety of applications.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A storage module that connects to a chassis of a vehicle, the chassis forming a door frame defining a door opening to a compartment of a vehicle, the storage module comprising:
   a housing conforming to the door opening and extending into the compartment in an installed configuration;
   an exterior panel disposed on a first side of the housing, the exterior panel conforming to an exterior surface of the vehicle enclosing the door opening;
   at least one storage compartment comprising a first access panel forming a portion of the exterior surface, the at least one storage compartment forming a first storage volume disposed inside the housing and the compartment in the installed configuration, wherein the at least one storage compartment further comprises a second storage volume having a second access panel, and wherein the storage module further comprises a mask overlayed on the first access panel and the second access panel, wherein the mask resembles the installed door; and
   a hinge assembly comprising:
      a body hinge bracket coupled with the door frame, the body hinge bracket configured to alternatively couple with an installed door and a storage module hinge bracket, the body hinge bracket hidden behind one of the installed door and the exterior panel, wherein the installed door pivotally couples with the body hinge bracket; and
      the storage module hinge bracket coupled with at least one of the housing and the exterior panel, the storage module hinge bracket operable between a free position and a coupled position, wherein the storage module hinge bracket couples with the body hinge bracket in the coupled position.

2. The storage module according to claim 1, wherein the exterior panel of the storage module interchangeably replaces a door of the vehicle.

3. The storage module according to claim 1, wherein the storage module connects to a door latch of the door of the vehicle in the installed configuration, wherein the door latch includes a door cinch device.

4. The storage module according to claim 1, wherein the storage module occupies a portion of the compartment including a portion of a passenger seat in the installed configuration.

5. The storage module according to claim 1, further comprising:
   a first locating mechanism forming a mating assembly between a first locator in connection with a floor portion of the passenger compartment and a second locator in connection with a second side of the housing.

6. The storage module according to claim 5, wherein the second side opposes the first side and extends into the passenger compartment in the installed configuration.

7. The storage module according to claim 5, wherein the first locator comprises a bracket forming a receiving opening in connection with the floor portion and the second locator forms a protrusion forming an exterior profile complementary to the receiving opening.

8. The storage module according to claim 5, wherein the first locator slidably engages the second locator positioning the storage module in a first direction.

9. The storage module according to claim 1, wherein the exterior panel comprises an inner surface opposing the exterior surface, the inner surface in connection with the housing, and wherein the storage module hinge bracket is in connection with at least one of the housing and the inside surface.

10. The storage module according to claim 1, wherein the storage module comprises a folding cart comprising a plurality of legs pivotably mounted to a base of the housing, wherein the legs fold between the base and the floor portion in the installed configuration.

11. A vehicle having a storage module comprising:
   a frame forming a door opening to a compartment of the vehicle, the frame configured to couple with the storage module and an access door;
   the access door enclosing the door opening, the access door removably coupled with the frame;
   the storage module interchangeable with the access door, the storage module insertable into the compartment of the vehicle, and the storage module comprising:
      a housing comprising an exterior profile conforming to the door opening, the housing extending into the compartment in an installed configuration;
      an exterior panel disposed on a first side of the housing, the exterior panel forming a portion of an exterior surface of the vehicle and enclosing the door opening the vehicle, wherein the exterior panel comprises an access panel; and
      at least one storage compartment comprising a drawer, the at least one storage compartment forming a first storage volume disposed inside the housing and the compartment in the installed configuration, wherein the at least one storage compartment is accessed via the access panel, and wherein the at least one storage compartment includes a latch assembly unexposed from the exterior of the vehicle; and
      a locator assembly comprising:
         at least one protrusion coupled with an underside of the housing, the at least one protrusion extending past a backside of the housing opposite the exterior profile of the housing; and
         at least one bracket directly coupled with a floor of the vehicle in the compartment, the bracket defining an opening configured to receive the at least one protrusion, wherein the opening receives the at least one protrusion, a length of the at least one protrusion extending past the backside of the housing; and
      a hinge assembly comprising:
         a body hinge bracket coupled with the frame, the body hinge bracket alternatively covered by the access door and the storage module, the body hinge bracket defining a first surface and a first aperture; and
         a storage module hinge bracket coupled with the housing, the storage module hinge bracket defining a second surface and a second aperture, wherein the storage module connects to the vehicle when the first surface mates the second surface, the first aperture is aligned with the second aperture at a common axis, and a pin axially aligned with the common axis is inserted through the first aperture and the second aperture, wherein a locating sensor coupled with the pin detects a targeted coupling between the body hinge bracket and the storage module hinge bracket.

12. The storage module according to claim 1, wherein the first side of the housing, the exterior panel, and the access panel enclose the door opening and conform to the exterior surface in the installed configuration.

13. The storage module according to claim 7, wherein the protrusion extends past a backside of the housing opposite the exterior profile of the housing.

14. The storage module according to claim 13, wherein the receiving opening receives the protrusion at least as far as the at least one protrusion extends past the backside of the housing.

15. A vehicle having an interchangeable storage module comprising:
- a frame forming a door opening to a compartment of the vehicle;
- an access door enclosing the door opening, the access door removably coupled with the frame at a hinge assembly and a powered latch assembly, the powered latch assembly including a cinching device, the access door partially defining a cavity, the hinge assembly including:
  - a body hinge bracket coupled with the frame, the body hinge bracket alternatively covered by the access door and a storage module, the body hinge bracket defining a first surface and a first aperture; and
  - a storage module hinge bracket coupled with the housing, the storage module hinge bracket defining a second surface and a second aperture, wherein the first surface mates the second surface, such that the storage module couples with the vehicle, the first aperture is aligned with the second aperture at a common axis, and a pin axially aligned with the common axis is inserted through the first aperture and the second aperture, wherein a locating sensor coupled with the pin detects a targeted coupling between the body hinge bracket and the storage module hinge bracket;
- the storage module interchangeable with the access door, the storage module removably coupled with the frame at the hinge assembly and the latch assembly, the storage module insertable into the compartment of the vehicle when the access door is removed, and the storage module comprising:
  - a housing comprising an exterior profile conforming to the door opening, the housing extending into the compartment in an installed configuration, the housing further defining the cavity;
  - an exterior panel disposed on a first side of the housing, the exterior panel forming a portion of an exterior surface of the vehicle and enclosing the door opening of the vehicle in the installed configuration, wherein the exterior panel comprises an access panel; and
  - at least two storage compartments comprising at least one drawer, the at least two storage compartments forming a first storage volume and a second storage volume, respectively, disposed inside the housing and the compartment in the installed configuration, wherein the at least two storage compartments are accessed via the access panel at a hidden latch assembly disposed within the cavity.

16. The interchangeable storage module according to claim 15, further comprising a folding cart comprising a plurality of legs pivotably mounted to a base of the housing, wherein the legs fold between the base and the floor portion in the installed configuration, wherein the legs are each coupled with a wheel, and wherein the legs and the wheel of each leg together vertically align the at least one protrusion with the rectangular opening of the at least one bracket.

17. The storage module according to claim 3, wherein the storage module includes a seal that sealably engages the door frame of the vehicle in response to the door cinch device of the latch assembly cinching the storage module with the door frame of the vehicle.

18. The storage module according to claim 3, wherein a human-machine interface of the vehicle controls the door cinch device to cinch and uncinch the storage module with the door frame.

* * * * *